(12) United States Patent
Roman et al.

(10) Patent No.: US 6,883,098 B1
(45) Date of Patent: Apr. 19, 2005

(54) METHOD AND COMPUTER SYSTEM FOR CONTROLLING ACCESS BY APPLICATIONS TO THIS AND OTHER COMPUTER SYSTEMS

(75) Inventors: John S. Roman, Acton, MA (US); Brian K. Wade, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 09/666,952

(22) Filed: Sep. 20, 2000

(51) Int. Cl.[7] .............................................. G06F 17/00
(52) U.S. Cl. ...................... 713/200; 713/150; 713/151; 713/152
(58) Field of Search ............................... 713/200–202, 713/150–152; 709/201–204

(56) References Cited

U.S. PATENT DOCUMENTS

| | | | | |
|---|---|---|---|---|
| 4,945,468 A | * | 7/1990 | Carson et al. .............. | 713/200 |
| 5,713,018 A | | 1/1998 | Chan | |
| 5,781,550 A | | 7/1998 | Templin et al. | |
| 5,787,175 A | | 7/1998 | Carter | |
| 5,825,877 A | | 10/1998 | Dan et al. | |
| 5,841,871 A | | 11/1998 | Pinkas | |
| 5,884,024 A | | 3/1999 | Lim et al. | |
| 5,937,159 A | * | 8/1999 | Meyers et al. .............. | 713/201 |
| 6,212,636 B1 | * | 4/2001 | Boyle et al. ................ | 713/168 |
| 6,321,337 B1 | * | 11/2001 | Reshef et al. ............... | 713/201 |
| 6,473,791 B1 | * | 10/2002 | Al-Ghosein et al. ........ | 709/217 |
| 6,829,704 B1 | * | 12/2004 | Zhang et al. ............... | 713/200 |
| 6,829,707 B1 | * | 12/2004 | Marshall et al. ............ | 713/150 |
| 6,829,712 B1 | * | 12/2004 | Madoukh ................... | 713/200 |

OTHER PUBLICATIONS

Secure compartmented data access over an untrusted network using a COTS–based architecture□□ Clark, P.C.; Meissner, M.C.; Vance, K.O.;□□ Computer Security Applications, 2000. ACSAC '00. 16th Annual Conference, Dec. 11–15, 2000 □□pp.: 217–223.*
Safe virtual execution using software dynamic translation□□Scott, K.; Davidson, J.;□□Computer Security Applications Conference, 2002. Proceedings. 18th Annual, Dec. 9–13, 2002 □□pp.: 209–218.*
An integrated management environment for network resources and services□□Bellavista, P.; Corradi, A.; Stefanelli, C.;□□Selected Areas in Communications, IEEE Journal on, vol.: 18, Issue: 5, May 2000 □□pp.: 676–685.*
Arsenault et al., "Trusted Network Interpretation of the TCSEC", 1987, Working Group, section 3.1.1.3, Labels.*
Sebes et al., SIGMA: Security for Distributed Object Interoperability Between Trusted and Untrusted Systems, 1996, IEEE, p. 158–168.*

* cited by examiner

*Primary Examiner*—David Jung
(74) *Attorney, Agent, or Firm*—McGinn & Gibb, PLLC; Authur J. Samodovitz, Esq.

(57) ABSTRACT

Application execution contexts within an untrusted computer system are classified as trusted or untrusted based on respective names assigned to the execution contexts. If an application runs in an untrusted execution context, an operating system within the untrusted computer system prevents the application from initiating a connection with a trusted computer system and accessing sensitive parts of the untrusted computer system. If the application runs in a trusted execution context, the operating system permits the application to initiate a connection with the trusted computer system.

36 Claims, 1 Drawing Sheet

METHOD AND COMPUTER SYSTEM FOR CONTROLLING ACCESS BY APPLICATIONS TO THIS AND OTHER COMPUTER SYSTEMS

FIELD OF THE INVENTION

The present invention generally relates to computer systems and associated methods and more particularly to a system and associated method for protecting computer systems from unauthorized access by certain applications.

DESCRIPTION OF THE RELATED ART

With the increasing sophistication of computer networks and the ability of the public to access private networks (e.g., through the Internet) there have been a number of recent systems and computer programs developed for protecting private networks from being improperly accessed by the public. For example, it is common to use sophisticated passwords and other security devices to prevent unauthorized access to a private network. However, the sophistication of the password and the ability to break passwords is an ever escalating "competition" which quickly renders password security applications obsolete. Therefore, password security applications require constant updating and maintenance. Further, all of the users must have a password to access the system, which limits the effectiveness of password security for Web servers.

Another such security means is known as a firewall. In one type of firewall system, the users transfer files to a firewall host, and then log into the firewall and subsequently transfer the file to the desired external party. Using a firewall prevents users for making a direct connection outside the private network and also prevents the public from reaching the private network because information can only be transferred by the firewall host. Other systems allow certain external users to "tunnel" through the firewall to allow direct access to the private network. Such systems contain high levels of security to allow the tunneling process to take place. However, firewalls and tunnels through firewalls are very cumbersome because the private network and the public need to deal with the intermediary firewall. This is a slow and cumbersome process and adds to the cost and complexity of the system.

Other systems use a proxy server to hide the identity of the private network. In such a system, communications are passed through the proxy server, which appears to the public to be the private network. However, only the proxy knows the true identity and location of the private network and the proxy does not allow the public access to the private network. As with the firewall system, the proxy system is cumbersome, expensive and requires constant maintenance.

Therefore, there is a need for a low-overhead system which limits access by an untrusted computer system to a private trusted computer system, but which simultaneously allows the trusted system full access to the untrusted system.

SUMMARY OF THE INVENTION

According to the present invention, application execution contexts within an untrusted computer system are classified as either trusted or untrusted based on distinctive application execution context names. A human administrator of the untrusted system assigns these distinctive application execution context names. The applications is the untrusted system cannot change the names of their own execution contexts (or preferably any other execution contexts in the untrusted computer system).

The untrusted application execution contexts are fenced off from certain parts of the untrusted computer system such that the untrusted application execution contexts cannot interrogate or change critical system data of the untrusted computer system.

Only applications on the untrusted computer system which execute in trusted execution contexts can initiate a connection with a trusted computer system. The trusted computer system can initiate connections with any execution context on the untrusted computer system. Only the untrusted application execution contexts on the untrusted system can initiate connections with an external computer system. The connections originating on the external system can terminate only at the untrusted system and can terminate only at untrusted execution contexts therein.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
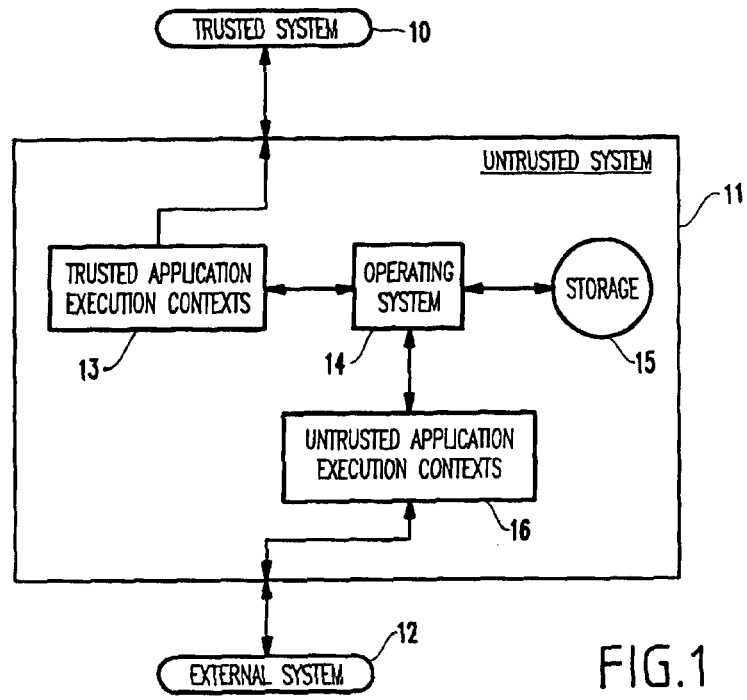
FIG. 1 is a schematic diagram of the present invention.

Referring now to the drawings, and more particularly to FIG. 1, a first embodiment of the present invention is illustrated in schematic form. The trusted system 10 shown in FIG. 1 comprises a private network to which users are permitted access through some form of security such as passwords, physical restriction, etc. The external system 12 shown in FIG. 1 represents computer networks owned by the public, such as the Internet and other private networks. One major concern is that the external system 12 may try to reach the trusted computer system 10 to misappropriate data or destroy the trusted system 10.

To prevent this, the invention positions an untrusted computer system 11 between the trusted computer system 10 and the external system 12. The untrusted system 11 includes an operating system 14 which controls many devices such as storage device 15 (e.g., a disk drive). The untrusted system exists to host data or run applications which must be made available to external system 12.

A key feature of the invention is that the untrusted system includes some applications that run in trusted application execution contexts 13 and other applications that run in untrusted application execution contexts 16. With the invention, the untrusted application execution contexts 16 cannot initiate communications with the trusted system 10. However, trusted application execution contexts 13 can initiate connections with the trusted system 10. Programs running on trusted system 10 can initiate connections to any context or untrusted system 11.

The invention distinguishes between trusted application execution contexts 13 and untrusted application execution contexts 16 according to distinctive application execution context names. A human administrator of system 11 with operating system 14 assigns each application execution context a distinctive name, and an application running in untrusted system 11 cannot tamper with the name of any execution context (i.e., its own or any others). The creation of the distinctive names and the classification of the names as trusted or untrusted is performed with a control in the operating system 14. In one example, the prefix for the trusted names (user ids) is a specifically-chosen alphanumeric character string, (i.e., the administrator of the operating system might specify that all names beginning with the characters "SFS" are trusted).

Certain applications running on behalf of users on external system 12 are given names by a human administrator of the operating system 14 which indicate that they are running in untrusted execution contexts 16. Other applications running on behalf of trusted system 10 are given other names by the human administrator of operating system 14 which indicate that they are running in trusted execution contexts 13.

Any application which is running in a context that has been assigned a "trusted" name by the system administrator executes as a trusted application. These "trusted" contexts (user ids) are unable to communicate with the external system 12. By segregating the application contexts into trusted and untrusted, allowing only the trusted application contexts 13 to initiate connections with the trusted system 10, and allowing the external network 12 to access only the untrusted contexts 16, security is achieved.

In a preferred embodiment two distinct communications protocols are used to distinguish between requests from the external system 12 and the trusted system 10. Requests from the external system 12 use one protocol (e.g., the TCP/IP protocol). Communications to/from the trusted system 10 use a different protocol (e.g., the APPC communications protocol). In this embodiment, the operating system 14 and the storage 15 are set up such that they cannot be manipulated or administered via the TCP/IP protocol (that is, TELNET access is disabled). Therefore, the operating system 14 and storage 15 cannot be compromised by users on external system 12. However, distinct communications protocols are not required to make the invention operable. So long as the operating system can determine the origin of a request through some means (e.g., by noting the TCP/IP interface that the request came through) the invention will operate properly.

Therefore, the invention provides a method for connecting two environments where there is a trusted side 10 and an untrusted side 11 so that the trusted side 10 can have access to all of the data (i.e., the trusted network 10 itself and the untrusted system 11), but the external system 12 can access only a subset of such data (i.e., the data made available through the applications running in untrusted contexts 16).

For example, the invention is very useful where a business has an Internet web page (which would reside on the untrusted system 11) yet still wants to have the Internet web data (in addition to all of its internal business data) accessible by employees who are on the trusted system 10. In the foregoing situation, the business with the trusted system 10 would need full control over access to the trusted system 10, through conventional security measures (e.g., passwords, physical isolation, etc.).

The security of the invention is achieved by the inventive ability of the operating system 14 to decide with application execution contexts are permitted to initiate connections to the trusted system 10. The communications software on the operating system 14 is programmed so that connection attempts with the trusted system 10 cannot originate from the untrusted application execution contexts 16. As mentioned above, the operating system 14 lets connection attempts to the trusted system 10 originate only from trusted execution contexts 13. The untrusted computer system 11 has a communication software stack and operating system whose controls and configuration parameters are adequately fenced from potentially untrustable applications. In other words, the operating system and communication stack are installed and configured such that untrusted contexts do not have access to their configuration information and are not authorized to control them. This is typically done with file permissions but each operating system will have different means.

With the system described above, if a user on the trusted system 10 attempts to connect to the untrusted system 11 to access some data, the user would be communicating with a trusted application execution context 13 and the connection would be allowed (and data would flow over the connection). However, if an external user 12 (accessing untrusted system 11 via an untrusted application execution context 16) tries to initiate a connection with the trusted system 10, the connection is rejected by the operating system 14. Therefore, the invention allows connections between the trusted system 10 and the untrusted system 11 to be initiated only from the trusted system 10, or from an application running in a trusted execution context 13.

Figure 2:
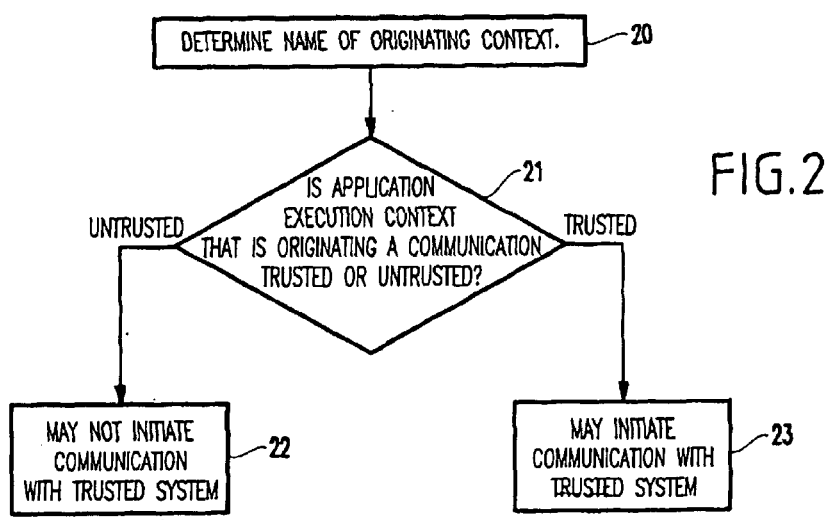
FIG. 2 is a flow diagram illustrating operation of the present invention.

FIG. 2 is a flow chart illustrating such operation of the present invention. In step 20, operating system 14 determines the name of the context originating a communication. This determination is made by retrieving the contents of the "context name" field of the data structure (a.k.a. "control block") describing the initiating context. Next, in step 21, the operating system 14 compares the context name to a list of trusted names (maintained in primary memory or in storage 15) or to a convention for trusted names (such as a particular prefix indicating trustworthiness). Then, operating system 14 determines whether the application execution context that is originating communication is trusted or untrusted. If the application execution context is untrusted, the context is not permitted to initiate communication with trusted system 10, as shown in step 22. However, if the application execution context is trusted, the context is permitted to initiate communication with the trusted system 10, as shown in step 23.

As an example, programming implementing steps 20–23 of the present invention could be added to an existing IBM VM/ESA Version 2 Release 4 operating system to yield operating system 14. In this scenario, untrusted system 11 would run the VM/ESA operating system augmented with the present invention and trusted system 10 would run the standard VM/ESA operating system without such augmentation. A networking connection between these two VM/ESA operating systems could be an existing VM/ESA Inter-System Facility for Communication (ISFC) link. When the augmented VM/ESA operating system 14 is untrusted system 11 determines that a connection is not permitted without trusted system 10 because the connection request originates from an untrusted execution context 16, operating system 14 does not let the untrusted context 16 use ISFC. However, if operating system 14 determines that a connection is permitted with trusted system 10 because the connection request originates form a trusted execution context 13, operating system 14 lets the trusted execution context 13 use ISFC to initiate Advanced Program-to-Program Communication (APPC) connection to the trusted system 10. The APPC protocol is described in IBM publications SC24-5760, "VM/ESA CP Programming Services", and other references.

By allowing trusted application execution contexts 13 in the untrusted system 11 to initiate communications with the trusted system 10, various VM/ESA features requiring such capability, such as the Shared File System (SFS), are easily enabled. The present invention would permit SFS to initiate the connection to trusted system 10 because SFS would be running in a trusted execution context 13.

With the present invention, system administration and overhead are reduced because only one operating system on two (untrusted and trusted) computer systems are required (even though one is modified). As explained above in the "Description of the Related Art", in order to conventionally attain the results produced by the present invention, several servers running multiple conventional operating systems would have to be utilized to ensure that users operating the untrusted system were denied access to the trusted system. Each of the servers would require more code (which slows the system down) and additional administrator time to set up the servers. Further, such a conventional system would be substantially more complicated to maintain than the present invention.

As noted above, applications running in untrusted execution contexts 16 cannot interrogate or update critical or sensitive system 11 data, such as a password file, the set of enrolled users, the list of trusted execution context names or the record of the name prefix that distinguishes trusted contexts from untrusted ones. This can be accomplished based on file permission and access schemes specific to the type of operating system 14. For example, when operating system 14 is an augmented VM/EAS operating system as explained above, applications running in untrusted execution contexts 16 are denied knowledge of and access to the disk volumes containing the CP directory, the TCP/IP communication stack configuration files, and the startup script containing the commands that activate ISFC filtering and define the trusted context name prefix. The CP directory contains the list of known users (that is, execution contexts) and their passwords. The TCP/IP communication stack configuration files list the names of the contexts that are allowed to communicate with external system 12. The startup script, run automatically by VM/ESA at startup time, contains privileged commands that activate the filtering of IFSC activity based on context name and define the name prefix that identifies trusted execution contexts.

While the invention has been described in terms of preferred embodiments, those skilled in the art will recognize that the invention can be practiced with modification within the spirit and scope of the appended claims.

What is claimed is:

1. A method for controlling access to a private computer system comprising:
   operatively connecting an untrusted computer between said private computer system and an external computer such that said external computer is prevented from communicating directly with said private computer system;
   classifying applications running on said untrusted computer system as running in one of a trusted application execution context and an untrusted application execution context; and
   preventing an application on said untrusted computer system from initiating a connection with said private computer system unless said untrusted computer system is running said application in said trusted application exception context;
   wherein only said untrusted application execution contexts of said applications on said untrusted system can communicate directly with said external computer system.

2. The method in claim 1, wherein said trusted private computer system can initiate connections with any execution context on said untrusted computer system.

3. The method in claim 1, wherein only said untrusted application execution contexts on said untrusted system can initiate connections with said external computer system.

4. The method in claim 1, wherein said applications are classified as having said trusted application execution contexts and said untrusted application execution contexts based on distinctive application execution context names.

5. The method in claim 4, wherein a human administrator of said untrusted system assigns said distinctive application execution context names.

6. The method in claim 4, wherein said applications cannot change the names of respective execution contexts in which said applications are running.

7. The method in claim 4, wherein said applications cannot change the name of any execution context in said untrusted computer system.

8. The method in claim 1, wherein connections originating on said external system can terminate only at said untrusted system and only at said untrusted execution contexts therein.

9. The method in claim 1, wherein said untrusted application execution contexts are fenced off from said untrusted computer system such that said untrusted application execution application contexts cannot interrogate or change critical system data of said untrusted computer system.

10. A method for controlling access to a private computer system comprising:
    operatively connecting an untrusted computer between said private computer system and an external computer such that said external computer is prevented from communicating directly with said private computer system;
    determining a name of an execution context of an application running on said untrusted system;
    determining whether said execution context is trusted or untrusted based on said name;
    if said execution context is trusted, permitting said application to initiate a connection with said private system, and
    if said execution context is untrusted, preventing said application from initiating a connection with said private computer system,
    wherein only untrusted application execution contexts on said untrusted system can communicate directly with said external computer system.

11. The method in claim 10, wherein said private computer system can initiate connections with any execution context on said untrusted computer system.

12. The method in claim 10, wherein only said untrusted application execution contexts on said untrusted system can initiate connections with an external computer system.

13. The method in claim 10, wherein said execution context name was previously assigned by a human administrator.

14. The method in claim 10, wherein there are a plurality of applications running on said untrusted computer system, one of said applications having a trusted execution context and another of said applications having an untrusted execution context.

15. The method in claim 14, wherein said applications cannot change names of the respective execution contexts in which said applications are running.

16. The method in claim 14, wherein said applications cannot change the name of any execution context in said untrusted computer system.

17. The method in claim 10, wherein connections originating on an external system can terminate only at said untrusted system and only at said untrusted execution contexts therein.

18. The method in claim 10, wherein said untrusted application execution contexts are fenced off from said untrusted computer system such that said untrusted application execution application contexts cannot interrogate or change critical system data of said untrusted computer system.

19. A program storage device readable by machine, tangibly embodying a program of instructions executable by the machine to perform a method for controlling access private to a computer system, said method comprising:

operatively connecting an untrusted computer between said private computer system and an external computer such that said external computer is prevented from communicating directly with said private computer system;

classifying applications running on an untrusted computer system as running in one of a trusted application execution context and an untrusted application execution context; and preventing an application on said untrusted computer system from initiating a connection with a said private computer system unless said untrusted computer system is running said application in said trusted application execution context;

wherein only said untrusted application execution contexts of said application on said untrusted system can communicate directly with said external computer system.

20. The program storage device in claim 19, wherein said private computer system can initiate connections with any execution context on said untrusted computer system.

21. The program storage device kin claim 19, wherein only said untrusted application execution contexts on said untrusted system can initiate connections with said external computer system.

22. The program storage device in claim 19, wherein said applications are classified as having said trusted application execution contexts and said untrusted application execution contexts based on distinctive application execution context names.

23. The program storage device in claim 22, wherein a human administrator of said untrusted system assigns said distinctive application execution context names.

24. The program storage device in claim 22, wherein said applications cannot change names of respective execution contexts in which said applications are running.

25. The method in claim 22, wherein said applications cannot change the name of any execution context in said untrusted computer system.

26. The program storage device in claim 19, wherein connections originating on said external system can terminate only at said untrusted system only at said untrusted execution contexts therein.

27. The program storage device in claim 19, wherein said untrusted application execution contexts are fenced off from said untrusted computer system such that said untrusted application execution contexts cannot interrogate or change critical system data of said untrusted computer system.

28. A system for controlling access to a network comprising:

a private computer system;

an untrusted computer system connected between said private computer system and an external computer system, such that said external computer is prevented from communicating directly with said private computer system;

wherein said untrusted system includes applications classified as having trusted application execution contexts and untrusted application execution contexts, and wherein only said trusted application execution contexts can initiate connections with said private computer system, and wherein only said untreated application execution contexts of said applications on said untrusted system can communicate directly with said external computer system.

29. The system in claim 28, wherein said private computer system can initiate connections with any execution context on said untrusted computer system.

30. The system in claim 28, wherein only said untrusted application execution contexts on said untreated system can initiate connections with said external computer system.

31. The system in claim 28, wherein said applications are classified as having said trusted application execution contexts and said untrusted application execution contexts based on distinctive application execution context names.

32. The system in claim 31, wherein a human administrator of said untrusted system assigns said distinctive application execution context names.

33. The system in claim 31, wherein said applications cannot change the names of respective execution contexts in which said applications are running.

34. The method in claim 31, wherein said applications cannot change the name of any execution context in said untrusted computer system.

35. The method in claim 28, wherein connections originating on said external system can terminate only at said untrusted system and only at said untrusted execution contexts therein.

36. The system of claim 28, wherein said untrusted application execution contexts are fenced off from said untrusted computer system such that said untrusted application execution application contexts cannot interrogate or change critical system data of said untrusted computer system.

* * * * *

UNITED STATES PATENT AND TRADEMARK OFFICE
CERTIFICATE OF CORRECTION

PATENT NO. : 6,883,098 B1
DATED : April 19, 2005
INVENTOR(S) : Roman et al.

It is certified that error appears in the above-identified patent and that said Letters Patent is hereby corrected as shown below:

Column 8,
Line 22, change "untreated" to -- untrusted --.

Signed and Sealed this

Twentieth Day of September, 2005

JON W. DUDAS
*Director of the United States Patent and Trademark Office*